United States Patent [19]

Suzuki et al.

[11] Patent Number: 4,940,285
[45] Date of Patent: Jul. 10, 1990

[54] SEAT SLIDING APPARATUS FOR VEHICLES

[75] Inventors: Saburo Suzuki, Tokoname; Hiroshi Nawa, Chiryu; Sadao Ito, Toyoake, all of Japan

[73] Assignee: Aisin Seiki Kabushiki Kaisha, Kariya, Japan

[21] Appl. No.: 330,503

[22] Filed: Mar. 30, 1989

[30] Foreign Application Priority Data

Mar. 31, 1988 [JP] Japan .............................. 63-044505[U]

[51] Int. Cl.$^5$ ................................................ A62B 35/02
[52] U.S. Cl. ...................................... 297/473; 248/430
[58] Field of Search ................. 297/473; 248/430, 429

[56] References Cited

U.S. PATENT DOCUMENTS

| 4,262,963 | 4/1981 | Bauer et al. ........................ 248/430 |
| 4,673,217 | 6/1987 | Nishiyama et al. ................. 297/473 |

FOREIGN PATENT DOCUMENTS

| 2702576 | 7/1978 | Fed. Rep. of Germany ...... 248/430 |
| 3630680 | 3/1988 | Fed. Rep. of Germany ...... 297/473 |
| 0018348 | 1/1987 | Japan .................................. 297/473 |

*Primary Examiner*—Laurie K. Cranmer
*Attorney, Agent, or Firm*—Finnegan, Henderson, Farabow, Garrett and Dunner

[57] ABSTRACT

A seat sliding apparatus for attachment to a vehicle comprises at least one lower rail fixedly secured to the vehicle; a corresponding upper rail slidably mounted on the lower rail, the upper rail being subject to a shock force in a direction separating the upper rail and the lower rail during operation of the vehicle; bearing device between the upper and lower rails for supporting the upper rail on the lower rail; and interlocking safety device on the upper and lower rails for maintaining substantial contact between the upper and lower rails and the bearing device when the shock force occurs.

7 Claims, 3 Drawing Sheets

SEAT SLIDING APPARATUS FOR VEHICLES

BACKGROUND OF THE INVENTION

1. Field of the Invention

The present invention relates to a seat sliding apparatus for vehicles.

2. Description of the Prior Art

A conventional seat sliding apparatus for vehicles is disclosed in Japanese utility model laid-open publication No. 61(1986)-138729, which was published without examination on Aug. 28, 1986. The conventional seat sliding apparatus includes a pair of laterally spaced lower rails which are fixedly secured to a vehicle body and a pair of laterally spaced upper rails slidably mounted on the lower rails for supporting a seat-cushion thereon. In detail, each of the lower rails has a substantially U-shaped cross-section and each of upper rails has a substantially inverted U-shaped cross-section. A roller is disposed between a central portion of each upper rail and a central portion of each lower rail. Each distal end of the upper rail is bent through approximately 90 degrees inwardly in the lateral direction and is formed into a lower projection. Each distal end of the lower rail is bent through approximately 90 degrees outwardly in the lateral direction and is formed into an upper projection, which is positioned above the lower projection. A set of balls is disposed between the upper and the lower projections. Since two upper projections are provided on the lower rail and two lower projections are provided on the upper rail to sets of balls are provided with the combination of the upper and lower rails. A unit is employed which accommodates the rollers and the sets of balls for unitary movement thereof.

In the conventional seat sliding apparatus, a belt-anchor-bracket is secured to one of the upper rails and a distal end of a seat-belt is detachably connected to the belt-anchor-bracket. In the case where the seat-belt is tensioned during collision of the vehicle, an unexpected strong force is applied to the upper rail in the upward direction. Since the lower projection of the upper rail is in the form of a cantilever configuration, the lower projection may be disengaged from the set of balls due to resulting force. This results in the separation of the upper rail from the lower rail.

SUMMARY OF THE INVENTION

It is, therefore, a principal object of the present invention to provide a seat sliding apparatus for vehicles without the aforementioned drawback.

Another object of the present invention is to provide a seat sliding apparatus for vehicles in which a safety means is employed for preventing the separation of the upper rail and the lower rail.

A further object of the present invention is to maintain a secure construction between the upper and lower rails of a seat sliding apparatus when forces of a vehicle collision are applied to the seat sliding apparatus.

To achieve the objects and in accordance with the purposes of the present invention, A seat sliding apparatus for attachment to a vehicle is comprised of at least one lower rail fixedly secured to the vehicle; a corresponding upper rail slidably mounted on the lower rail, the upper rail being subject to a shock force in a direction separating the upper rail and the lower rail during operation of the vehicle: bearing means between the upper and lower rails for supporting the upper rail on the lower rail; and interlocking safety means on the upper and lower rails for maintaining substantial contact between the upper and lower rails and the bearing means when the shock force occurs.

BRIEF DESCRIPTION OF THE DRAWINGS

The above and other objects, features and advantages of the present invention will be become apparent and more readily appreciated from the following detailed description of preferred exemplary embodiments of the present invention, taken in connection with the accompanying drawings, in which.

DETAILED DESCRIPTION OF THE PREFERRED EMBODIMENTS

Figure 1:
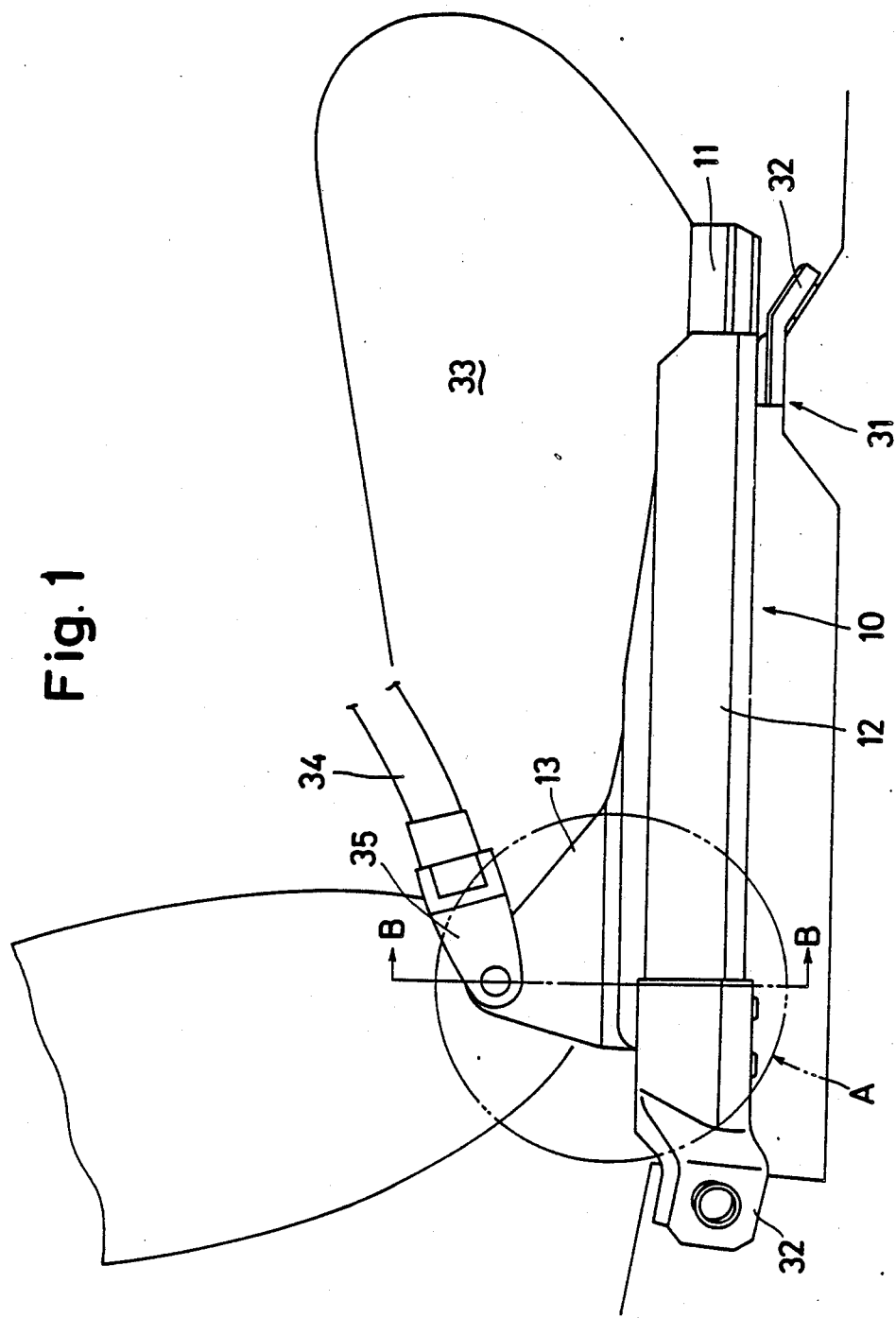
FIG. 1 is a side view of a seat sliding apparatus according to the present invention.

Referring now to FIG. 1, a seat sliding apparatus 10 is fixedly secured to a floor 31 of a vehicle-body (not shown) via a bracket 32. On the seat sliding apparatus 10, a seat-cushion 33 is fixedly mounted so as to be movable in the longitudinal direction of the vehicle body. The seat sliding apparatus 10 is provided with a seat-belt-buckle 35 to which a distal end of a seatbelt 34 is detachably connected.

Figure 2:
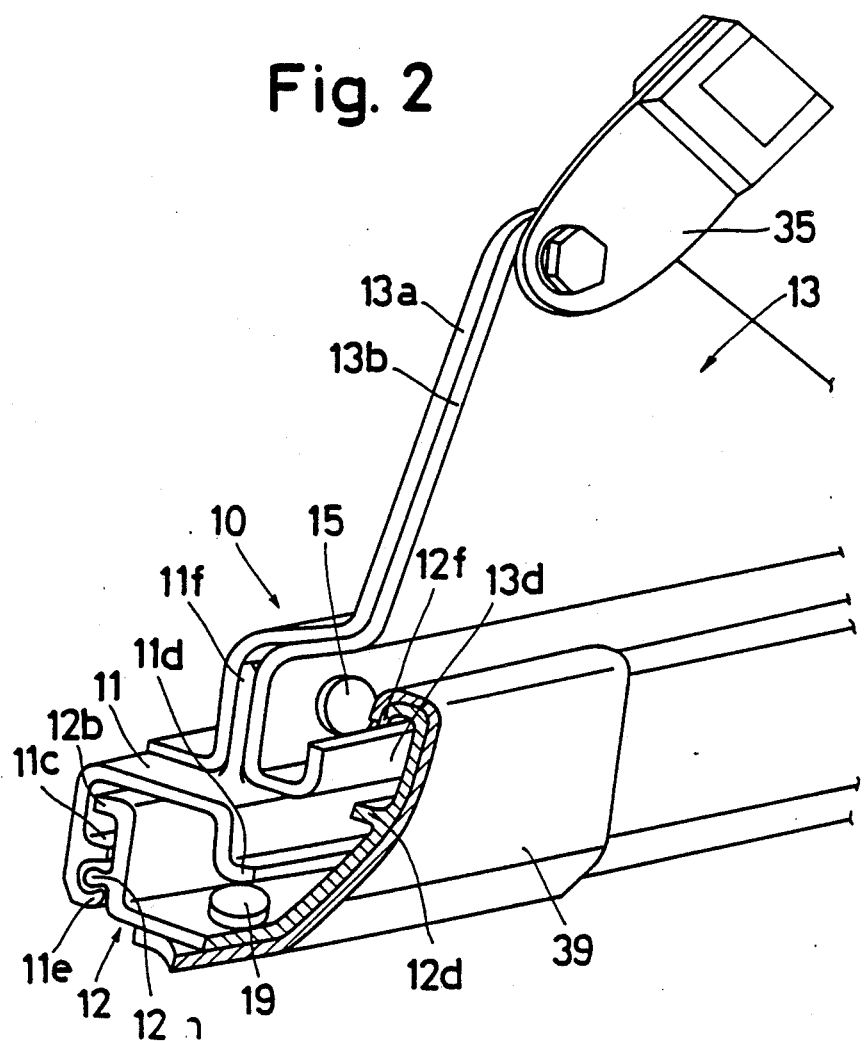
FIG. 2 is an enlarged perspective view of a portion indicated by A in FIG. 1.
Figure 3:
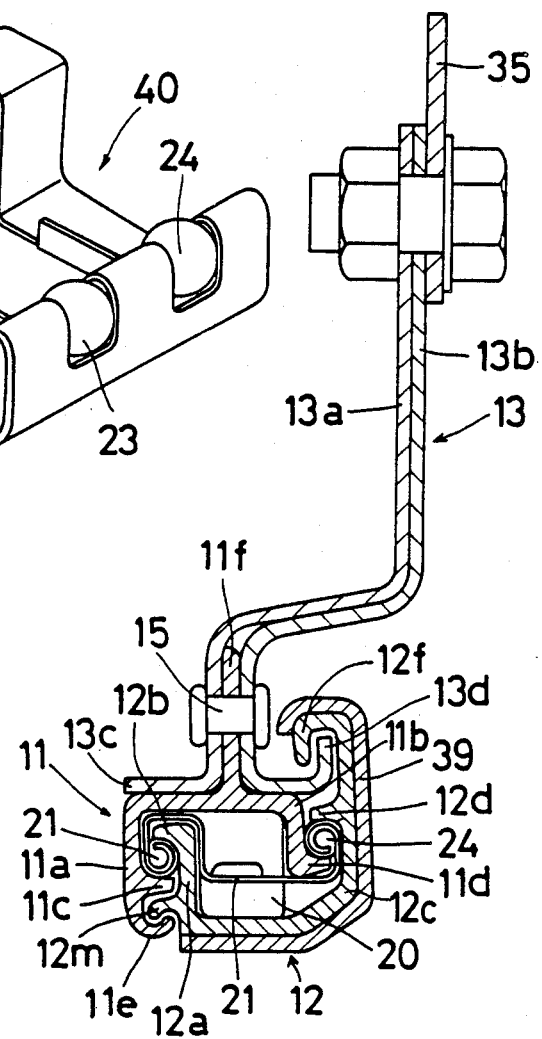
FIG. 3 is a cross-sectional view taken along line B—B in FIG. 1.

As illustrated in FIGS. 2 and 3, seat sliding apparatus 10 includes a pair of laterally spaced rails 11 (only one is shown). Each upper rail 11 has an inverted substantially U-shaped cross-section on which the seat-cushion 33 is secured, a lower rail 12 having a substantially U-shaped cross-section which is secured to the floor 31 of a vehicle-body, and a set of mutually connected plates 13a and 13b of a belt-anchor-bracket 13 for pivoting the seat-belt-buckle 35.

The upper rail 11 has a first side wall 11a from which a first projection 11c is projected in the inner direction and a second side wall 11b from which a second projection 11d is projected in the outer direction. Both projections 11c and 11d are arranged at the same level from the floor 31.

A distal end 11e of the first side wall 11a is formed into a hook configuration after being bent in the inner direction and upper direction in turn. Further, upper rail 11 has an upward extension 11f inserted between the plates 13a and 13b. The extension 11f, the plate 13a and the plate 13b are fastened by a pin 15. A distal end 13c of the plate 13a is bent in the outward direction through about 90 degrees and rests on the upper rail 11. A distal end 13d of the plate 13b is formed into a substantially U-shaped configuration which rests on the upper rail 11.

The lower rail 12 has a first side wall 12a from which a first projection 12b projects in the outer direction so as to be positioned above the first projection 11c of the upper rail 11. The lower rail 12 also has a second side wall 12c from which a second projection 12b projects in the inner direction so as to be positioned above the second projection 11d of the upper rail 11. Further, a third projection 12m which is slightly bent into the downward direction is projected from the first side wall 12a of the lower rail 12 and extends into between the first projection 11c and the third projection 11e of the upper rail 11. A distal end 12f of the second wall of the lower rail 12 first extends in the upward direction, and then extends in the horizontal direction and the downward direction, thereby defining a space into which a distal end 13d of the plate 13b is inserted. A bracket 39 is juxtaposed on the lower rail and is connected to a lower side thereof by the rivet 19 FIG. 11.

Figure 4:
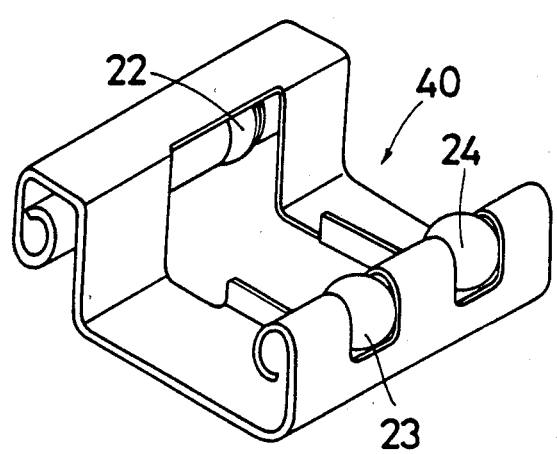
FIG. 4 is a perspective view of a holder for accommodating a roller and balls.

As apparent from FIGS. 3 and 4, for enabling the sliding movement of the upper rail 11 along the lower rail 12, a roller 20 and four balls 21, 22, 23 and 24 are utilized. The roller 20 is disposed between the upper rail 11 and the lower rail 12. The pairs of balls 21 and 22, and 23 and 24 are interposed between the first projection 12b of the lower rail 12 and the first projection 11c of the upper rail 11 and the second projection 12d of the lower rail 12 and the second projection 11a of the upper rail 11, respectively. In order to assure the simultaneous movement of the roller 20 and balls 21-24, a holder 40 is employed as shown in FIG. 4.

In the foregoing construction, despite insufficient engagement between the upper rail 11 and the lower rail 12 via balls 21–24, when an unexpected strong force is applied from the seatbelt 36 to the upper rail 11 in the upward direction due to a vehicles-collision, the upper rail 11 cannot be separated from the lower rail 12 as a result of the engagement between the third projection 11e of the upper rail and the third projection 12m of the lower rail 12.

While the invention has been particularly shown and described with referrence to preferred embodiments thereof it will be understood by those skilled in the art that the foregoing embodiment and other changes in form and detail could be made therein without departing from the spirit and the scope of the invention.

What is claimed is:

1. A seat sliding apparatus for attachment to a vehicle, comprising:
    at least one lower rail fixedly secured to the vehicle, the at least one lower rail having upwardly extending first and second spaced sidewalls;
    a corresponding upper rail, having first and second downwardly extending spaced sidewalls adjacent the respective first and second upwardly extending sidewalls, mounted on the lower rail;
    a seat belt anchor means extending from the upper rail, the upper rail through the anchor means being subject to a shock force in a direction separating the upper rail and the lower rail during operation of the vehicle;
    bearing means including opposing surfaces of the adjacent first and second sidewalls of the upper and lower rails for slidably supporting the upper rail on the lower rail;
    first interlocking safety means, including corresponding interfitting portions of the adjacent first sidewalls of the upper and lower rails; and
    second safety interlocking means, including an interfitting portion of the second sidewall of the lower rail and the seat belt anchor means, the first and second safety interlocking means maintaining substantial contact between the upper and lower rails and the bearing means upon the occurrence of a shock force.

2. The apparatus of claim 1 wherein the interfitting portions of the first interlocking safety means includes a hook on the first sidewall of the upper rail and a corresponding projection on the first sidewall of the lower rail, the hook contacting the projection for maintaining the contact between the bearing means and the upper and lower rails.

3. The apparatus of claim 1 wherein the at least one lower rail and the corresponding upper rail include a pair of laterally spaced corresponding upper and lower rails, and wherein the bearing means includes a plurality of pairs of balls between said opposing surfaces of each pair of upper and lower rails.

4. The apparatus of claim 1 wherein the anchor means includes a bracket attached to the upper rail, the bracket having two substantial matched triangular plates, each including an elongated portion, and the upper rail including and extension for attachment between the elongated portions of the plates.

5. The apparatus of claim 5 wherein the extension of the upper rail extends in a direction opposite the extending sidewalls and originates from a location spaced from and between the spaced sidewalls.

6. The apparatus of claim 5 wherein the interfitting portions of the first interlocking safety means includes a hook on the first sidewall of the upper rail and a corresponding projection on the first sidewall of the lower rail, the hook contacting the projection for maintaining the contact between the bearing means and the upper and lower rails.

7. The apparatus of claim 4 wherein the interfitting portions of the first interlocking safety means includes a hook on the first sidewall of the upper rail and a corresponding projection on the first sidewall of the lower rail, the hook contacting the projection for maintaining the contact between the bearing means and the upper and lower rails.

* * * * *

UNITED STATES PATENT AND TRADEMARK OFFICE
CERTIFICATE OF CORRECTION

PATENT NO.  : 4,940,285
DATED       : July 10, 1990
INVENTOR(S) : SABURO SUZUKI ET AL.

It is certified that error appears in the above-identified patent and that said Letters Patent is hereby corrected as shown below:

Claim 4, column 4, lines 29-30, "including and" should be --includes an--.

Claim 5, column 4, line 33, "rail" should be --rail--.

Signed and Sealed this

Seventeenth Day of November, 1992

*Attest:*

DOUGLAS B. COMER

*Attesting Officer*       Acting Commissioner of Patents and Trademarks